United States Patent [19]

Broderick et al.

[11] Patent Number: 5,154,938
[45] Date of Patent: Oct. 13, 1992

[54] GUM COMPOSITION HAVING DISPERSED POROUS BEADS CONTAINING PLASTICIZERS

[75] Inventors: Kevin B. Broderick, Berwyn; David W. Record, River Forest, both of Ill.

[73] Assignee: Wm. Wrigley Jr. Company, Chicago, Ill.

[21] Appl. No.: 633,017

[22] Filed: Dec. 20, 1990

[51] Int. Cl.⁵ .............................................. A23G 3/30
[52] U.S. Cl. ........................................ 426/5; 426/96; 426/99
[58] Field of Search ........................ 426/3-6, 426/96, 99

[56] References Cited

U.S. PATENT DOCUMENTS

| | | | |
|---|---|---|---|
| 2,973,273 | 2/1961 | Curtiss | 426/5 |
| 3,390,050 | 6/1968 | Speiser | 167/83 |
| 3,886,084 | 5/1975 | Vassiliades | 252/316 |
| 3,912,817 | 10/1975 | Sapsowitz | 426/5 |
| 3,962,463 | 6/1976 | Wetzel | 426/5 |
| 3,985,298 | 10/1976 | Nichols | 239/54 |
| 3,989,649 | 11/1976 | Kaiho et al. | 260/2.1 R |
| 4,000,321 | 12/1976 | Mochizuki et al. | 426/5 |
| 4,233,319 | 11/1980 | Fritz et al. | 426/5 |
| 4,259,355 | 3/1981 | Maimo | 426/5 |
| 4,322,311 | 3/1982 | Lim et al. | 252/316 |
| 4,324,683 | 4/1982 | Lim et al. | 252/316 |
| 4,407,957 | 10/1983 | Lim | 435/178 |
| 4,444,699 | 4/1984 | Hayford | 264/4.7 |
| 4,464,271 | 8/1984 | Munteanu et al. | 252/8.6 |
| 4,485,118 | 11/1984 | Carroll et al. | 426/5 |
| 4,496,592 | 1/1985 | Kuwahara et al. | 426/5 |
| 4,497,832 | 2/1985 | Cherukuri et al. | 426/5 |
| 4,568,560 | 2/1986 | Schobel | 426/5 |
| 4,588,592 | 5/1986 | Elias | 426/5 |
| 4,590,075 | 5/1986 | Wei et al. | 426/5 |
| 4,673,577 | 6/1987 | Patel | 426/5 |
| 4,690,825 | 9/1987 | Won | 424/501 |
| 4,711,784 | 12/1987 | Yang | 426/5 |
| 4,744,991 | 5/1988 | Seipellni | 426/5 |
| 4,963,369 | 10/1990 | Song et al. | 426/5 |
| 4,978,537 | 12/1990 | Song | 426/5 |

FOREIGN PATENT DOCUMENTS 9007882 7/1990 PCT Int'l Appl. .................. 426/5

Primary Examiner—Jeanette Hunter
Attorney, Agent, or Firm—Willian Brinks Olds Hofer Gilson & Lione

[57] ABSTRACT

A gum having extended softness during the chew that contains water-insoluble porous polymeric beads having microporous passages impregnated with plasticizer.

10 Claims, No Drawings

GUM COMPOSITION HAVING DISPERSED POROUS BEADS CONTAINING PLASTICIZERS

BACKGROUND OF THE INVENTION

This invention relates in general to chewing gum compositions, and in particular to an improvement that includes adding to a chewing gum porous polymeric water-insoluble polymeric beads that have microporous passages impregnated with one or more plasticizers.

Chewing gum generally contains a neutral and essentially tasteless masticatory gum base and one or more non-masticatory active ingredients mixed into the base. Active ingredients are those such as sweeteners, flavoring agents, flavor enhancers and potentiators and food-grade acids that determine flavor and taste characteristics of the gum. Other active ingredients include medicinal or pharmaceutical agents, or breath-freshening ingredients that treat or reduce bad breath. In addition, the chewing gum may and usually does contain water-soluble and usually sweet non-masticatory bulking agents, coloring agents, and plasticizing agents, the latter improving the texture of the gum.

Plasticizer agents are important to the chewing texture of the gum since they make the base more pliable in the mouth. After extended chewing, the plasticizer tends to loose its effectiveness since much of the water-soluble fractions of the gum have been extracted early in the chew, leaving a noticeably less pliable cud in the mouth. While a considerable amount of the plasticizer originally in the gum may still be left in the gum later in the chew, it tends to lose its effectiveness because the cud feels more dense or tight after the loss of much of the water-soluble fractions.

Although the addition of more plasticizer to the initial gum composition may seem to be a solution to this problem, it can create another. Additional plasticizer can render the initial gum too pliable, almost syrupy to the consumer. Until now, tightness late in the chew has been tolerated.

SUMMARY OF THE INVENTION

According to the current invention, a chewing gum matrix has dispersed in it water-insoluble, porous polymeric beads that have microporous passages in them impregnated with one or more plasticizing agents. A chewing gum of this invention when masticated will slowly release plasticizer from the beads into the gum matrix as it is chewed to make the gum more pliable late in the chew after much of the water-soluble ingredients have been extracted.

In other embodiments of this invention, the plasticizer-impregnated beads are impregnated with a plasticizer that is liquid at chewing (i.e. body) temperature. In addition, the beads can be coated with water-soluble or water-insoluble coatings that can further retard the release of the plasticizer.

DESCRIPTION OF THE PRESENTLY PREFERRED EMBODIMENTS OF THE INVENTION

In the present invention, a chewing gum includes any chewable and substantially water-insoluble gum base in an amount ranging from approximately 5 to 99%, but preferably about 25% of the total chewing gum composition. The gum may contain a calcium carbonate or a talc filler. The insoluble gum base generally includes elastomers, resins, fats and oils, waxes, softeners, and inorganic fillers. Elastomers may include polyisobutylene, isobutylene-isoprene copolymer, styrene-butadiene copolymer, rubber as well as natural latexes, such as chicle. Resins include polyvinyl acetate and terpene resins. Fats and oils may also be included in the gum base, including tallow, hydrogenated and partially hydrogenated vegetable oils, and cocoa butter. Commonly employed waxes include paraffin, microcrystalline and natural waxes, such as beeswax and carnauba.

The gum base typically also includes a filler component such as calcium carbonate, magnesium carbonate, talc, dicalcium phosphate and the like. The filler may also constitute between about 5% to about 60% by weight of the gum base. Preferably, the filler comprises about 5% to about 50% by weight of the base.

The gum base may also contain optional ingredients such as antioxidants, colors, and emulsifiers. The present invention contemplates the use of any commercially acceptable gum base.

The gum base of this invention also includes plasticizers that are directly added to the gum base either as part of the gum base itself or as part of the water-soluble portion of the gum base. By "directly added" is meant that such plasticizers are not included in and are in addition to the plasticizers that are contained within the porous microbeads discussed below. The "directly added" plasticizers (also known in the art as softeners or plasticizing agents) generally constitute between about 0.5% to about 15.0% by weight of the chewing gum. Directly added plasticizers include glycerine, lecithin, and combinations thereof.

In addition to the directly added plasticizers, the water-soluble portion of the chewing gum of this invention may include sweeteners, flavoring agents, and combinations thereof. Sweeteners include aqueous sweetener solutions such as those containing sorbitol, hydrogenated starch, hydrolysates, corn syrup, and combinations thereof. Such aqueous sweeteners may also be used as the directly added plasticizers and binding agents in the gum. Artificial sweeteners (e.g. aspartame) can also be used.

The flavoring agents may comprise essential oils, synthetic flavors, or mixtures thereof, including, but not limited to, oils derived from plants and fruits such as citrus oils, fruit essences, peppermint oil, spearmint oil, clove oil, oil of wintergreen, anise and the like. Artificial flavoring components are often included. Those skilled in the art will recognize that natural and/or artificial flavoring agents may be combined in any sensorially acceptable blend. All such flavors and flavor blends are contemplated for use in this invention.

This invention contemplates the addition to the gum described above of water-insoluble porous polymeric beads preferably of a size not discernible to the consumer where the beads have microporous passages impregnated with one or more plasticizers. Preferred plasticizers include those that are liquid or semi-liquid at chewing (i.e. body) temperature. Such preferred plasticizers include, but are not limited to vegetable oils, hydrogenated vegetable oils, triacetin, glycerin, propylene glycol, lecithin, and food-grade organic solvents.

The porous polymeric beads may be coated with coatings such as zein; wax; gum arabic; fatty acids; fats; a food-grade shellac; carbohydrates; silica; water-insoluble polymers (e.g. polyvinyl acetate); proteins such as casein; starches; dextrins; or modified or unmodified cellulosics such as ethyl, methyl, hydroxypropyl, or hydroxyethyl cellulose. These coatings influence the release of the plasticizer(s) in the microporous passages in the porous polymeric beads so that the plasticizer can be released at a time during the chew when the chewing gum would otherwise become tight.

It is also possible with the porous polymeric beads of this invention to have different populations of beads in the gum, each of which is coated with a different coating to allow sequential release of the plasticizer(s) in the beads.

Similarly, it is possible to have one or more populations of beads that are coated while one or more populations are uncoated. Alternatively, it is possible to have different populations, each of which has a different plasticizer in it. Different plasticizers can be chosen with different affinities toward the beads so that some plasticizers will be released more gradually than others.

It is also possible to have a gum with one or more populations of beads that contain flavoring agents, sweeteners and/or other active chewing gum ingredients such as disclosed in U.S. patent application Ser. No. 299,781 filed Jan. 19, 1989 (now U.S. Pat. No. 4,963,369) which is incorporated herein by reference.

In general, the chewing gum of this invention is manufactured by sequentially adding the various chewing gum ingredients to a commercially available mixer known to one skilled in the art. After the ingredients have been thoroughly mixed, including the impregnated polymeric beads, the gum mass is discharged from the mixer and shaped into the desired form such as by rolling into sheets and cutting into sticks, extruding into chunks, or casting into pellets. Generally, the ingredients are mixed by first melting the gum base and adding it to the running mixer. The base may also be melted in the mixer itself. Color or emulsifiers may also be added at this time. A softener such as glycerine may also be added along with syrup and a portion of the bulking agent. Further portions of the bulking agent may then be added to the mixture along with the polymeric beads. Flavoring agents are typically added with the final portion of the bulking agent. Sweeteners can be added after the final portion of the bulking agent has been added.

The entire mixing procedure typically takes about 5 to 15 minutes, but longer mixing times may be required. Those skilled in the art will recognize that many variations of the above described procedures may be followed including the addition of the beads early or late in the process.

The polymeric beads of this invention are polymerized in such a fashion that the microporous passages are formed during polymerization. Such a procedure is described below. Residual monomer is then extracted as described below so that the particles can be impregnated with the plasticizers. The beads are optionally coated with one or more coatings and blended into a gum. The details of microparticle polymerization, monomer extraction and microparticle impregnation and coating are described below, followed by Examples I through IV that illustrate various specific chewing gums and polymeric beads of this invention.

I. Polymeric Bead Polymerization

In one embodiment of this invention, the polymeric beads of the present invention can be polymerized as taught in U.S. Pat. No. 4,690,825 to Won dated Sep. 1, 1987, which is incorporated herein by reference. Specifically, the beads used in this invention can be prepared by polymerizing one or more polymers by a free radical suspension polymerization process in which a monomer or pair of comonomers is suspended in an inert porogen to form a phase or solvent incompatible with that porogen. Such a phase or solvent can be water with stabilizing additives. After the solution is suspended in the phase, the solution and phase are agitated to form droplets of solution suspended in the phase. After the formation of the droplets, the monomer or monomers in the droplets are activated to initiate a polymerization reaction in which the monomer is crosslinked, or where two or more monomers are polymerized to form porous beads having a network of pores with the porogen within the network of pores. The activation may be triggered by an initiator that is insoluble with the monomer solution. Alternatively, activation may be triggered by an energy source such as irradiation. The inert porogen serves as an internal diluent during polymerization and introduces the desired sponge-like microporous structure or network of pores into the finished bead. The inert porogen does not react with the monomer(s) present during polymerization or inhibit the polymerization. The bead may or may not swell in the inert porogen. After formulation of the porous beads, the beads are separated from the phase and subjected to one or more extraction steps such as washing to remove any unreacted monomer or impurity from the beads. After extraction, as described below, the beads may be dried to obtain a powder-like substance that include the beads but not porogen or solvent.

An example of a polymer that can be used to form polymeric beads for the gum of this invention is a copolymer of divinylbenzene and styrene. Such beads can be polymerized in water as taught in the aforesaid Won patent or as described in Example I below. If such a copolymer is used, typically monomers that are not food-approved additions are not completely reacted, and excess monomer should be reduced to a concentration less that 30 ppm (as illustrated by the styrene monomer standards for food-grade styrene-butadiene rubber (Food Chemical Codex, 3rd Edition, pg. 42)) if the beads are to be used in a food product. Typically, the amount of free crosslinking agent (divinylbenzene) in the beads after polymerization is quite low compared with styrene because divinylbenzene has two reaction sites, and thus is more reactive than styrene. Thus, the extraction is primarily to extract styrene monomer, the divinyl benzene monomer present in the polymer already being close to or lower than the 30 ppm value. An extraction procedure is explained in Section II below and in Example I.

To avoid or reduce the effort required in monomer extraction, one can copolymerize divinylbenzene with a food-grade monomer that can polymerize with divinylbenzene. By a "food-grade monomer" is meant any monomer that is a food additive permitted for direct addition to food for human consumption under 21 C.F.R. part 172 or substances generally recognized as safe under 21 C.F.R. part 182. Examples of such monomers are one or more of the following: estragole, limonene, carvone, eugenol, and ocimene. Limonene is illustrative inasmuch as it is a naturally occurring compound in many citrus fruits. Still other examples are provided in Example III, infra.

The food-grade monomer need not be extracted unless one wants to extract it for flavor reasons. But in many instances, the food-grade monomer may enhance the flavor of the gum. Thus, extraction of monomer after polymerization may only have to focus on divinylbenzene reduction, a comparatively simple proposition because it is in already comparatively low concentration.

II. Monomer Extraction

If monomer extraction is desired or required, it can be done by washing the beads first with water followed by several (preferably three) washings of isopropanol, four to five washings with acetone, and four to five washings with hexane. The excess solvent is removed by evaporation under a nitrogen blanket to leave dry beads having a powder-like consistency.

III. Polymeric Bead Impregnation With Plasticizer

The impregnation of the beads with plasticizer can be accomplished by soaking the beads in a equal or greater weight of a liquid containing the desired plasticizer so that the beads are completely immersed. The soaking proceed over a period of at least six and preferably 48 hours. The soaking may be carried out at a reduced temperature if stability or volatility of the plasticizer is a concern, or at an elevated temperature to reduce the viscosity of the plasticizer if necessary to hasten the impregnation process.

Of the total dry weight of the loaded beads after impregnation, 60% or even more may be plasticizer. Such loadings are possible using this procedure, although some bead/plasticizer combinations will yield lower loadings.

IV. Polymeric Bead Coating

As indicated above, the porous polymeric beads can be coated with a coating that retards the release of the plasticizer from the beads. Illustrative coatings are listed above. Depending upon the thickness and porosity of the coating, such coatings will retard the release of the plasticizer to a greater or lesser degree by first requiring the coating to dissolve or melt before the plasticizer is released.

There are a variety of methods for coating the beads that can be practiced:

A. Spray Drying

An emulsion/solution of beads and coating is atomized into an air stream that evaporated the colvent to leave the coated beads. A Niro spray dryer may be used.

B. Spray Chilling

A suspension of beads in molten encapsulant is atomized and chilled to produce beads coated with encapsulant.

C. Fluid Bed Coating

Beads are suspended in an air stream (fluidized bed). The beads are sprayed with a solution of the coating in a volatile solvent. The solvent is evaporated or dryed by the air stream to produce beads coated by the encapsulant/coating.

D. Granulation/Agglomeration

A damp mix of beads and coating is prepared, then dried and ground to the desired particle size.

E. Gel Encapsulation

Beads are suspended in a gelatin solution that is cooled to gel, then ground to the desired particle size.

F. Melt Blending

Beads are mixed into a molten agglomerant which is cooled to hardness and ground to the desired particle size.

The following examples of the invention are provided by way of explanation and illustration. They are not intended to limit the invention.

EXAMPLE I

Peppermint-Flavored Gums

A. Preparation of Microbeads

Gelatin (250 mg.) is added to a three-necked flask purged with nitrogen. Water (150 ml.) is heated to 50° C. and added to the flask to dissolve the gelatin. While the contents of the flask are stirred, a freshly prepared solution of benzoyl peroxide (1.25 grams; 1.03 mole) and styrene (22.9 grams; 0.22 mole) monomer is added, followed by divinylbenzene (12.0 grams; 42 moles). The mixture is heated to 90° C. while maintaining a constant stirring rate, and passing nitrogen through the flask.

The mixture is stirred for two hours, and cooled to room temperature, and the supernatant liquid is decanted. The polymer beads are washed with hexane several times, and stirred in hexane (200 ml.) for two hours to remove and excess styrene and divinylbenzene, and dried overnight at 50° C. in a vacuum to yield dry microbeads.

B. Impregnation of Microbeads With Plasticizer

Triacetin is impregnated into the microbeads of part A above by soaking the microbeads in the triacetin in an enclosed vessel, preferably under vacuum. The resulting beads contain approximately 50% triacetin by weight.

C. Preparation of Peppermint Gum

To a gum base, sugar, corn syrup corn syrup, dextrose, peppermint oil, and microbeads from part B are added in the proportion by weight set forth in Table I.

TABLE I

| Ingredient | Percent By Weight |
|---|---|
| Base | 20.68 |
| Sugar | 50.81 |
| Glycerin | 0.94 |
| Corn Syrup | 16.86 |
| Dextrose | 10.15 |
| Microbeads From Part B | 0.40 |
| Peppermint Oil | 0.56 |

A similar gum composition can be formulated to that of Table I by adding 0.33 parts by weight of the microbeads from part B instead of 0.40 parts. With either formulation, the resulting gum composition will remain soft for an extended time during the chew.

EXAMPLE II

Spearmint Gums

A. Preparation of Methacrylate Beads With Triacetin

Microbeads copolymerized with methylacrylate and ethylene glycol dimethacrylate ("Methacrylate Beads) as taught in the aforesaid Won patent and available in Advanced Polymer Systems, Inc. of Redwood City, Calif. are impregnated with triacetin following the procedure of Example I, part B. The resulting beads contain approximately 50% triacetin by weight.

B. Preparation of Spearmint Gums

1. Spearmint Gum With Methacrylate/Triacetin Microbeads

To a gum base, glycerine, corn syrup, triacetin, sugar, dextrose, spearmint oil, and the microbeads of part A are added in the proportion by weight set forth in Table II.

TABLE II

| Ingredient | Percent By Weight |
| --- | --- |
| Base | 20.68 |
| Corn Syrup | 16.86 |
| Sugar | 51.75 |
| Spearmint Oil | 0.56 |
| Dextrose | 10.15 |
| Microbeads from part A | 1.00 |

2. Spearmint Gum With Styrene-Divinylbenzene/Triacetin Microbeads

The gum formulation of Table II can be varied by adding (in lieu of the microbeads of Table II) styrene-divinylbenzene microbeads from Example I impregnated with 60% by weight of triacetin so that the impregnated beads comprise 0.83% of the gum formulation. In this modified base, the sugar content is increased to 50.92%.

3. Spearmint Gum With Methacrylate/Glycerin Microbeads

The gum formulation of Table II can be modified by adding (in lieu of the microbeads in Table II) the methacrylate beads from part A of this example impregnated with glycerin in the amount of 50% by weight of the beads so that the impregnated beads comprise 2.0% of the gum formulation. The sugar content is reduced to 49.75%.

4. Spearmint Gum With Styrene-Divinylbenzene/Glycerine Microbeads

The gum formulation of Table II can be modified by adding (in lieu of the microbeads of Table II) styrene-divinylbenzene microbeads of Example I impregnated with 60% (by weight of the microbeads) glycerin so that the impregnated microbeads comprise 1.67% of the gum composition. The sugar is altered to 50.08% of the gum composition.

The gum formulations of (C)(1-4) of this example will remain soft over an extended time during the chew and will retain flexibility during shelf storage.

EXAMPLE III

Alternative Microbead Formulations

Various microbead formulations can be used in the gums of the present invention besides the microbeads disclosed above. A number of types of microbeads can be prepared following the procedure set forth in Example I, part A, altering the amount of monomer to be polymerized with divinylbenzene, or changing the monomer to be polymerized with divinylbenzene. A summary of such microbeads formulations is set forth in Table III below.

TABLE III

| Monomer | Monomer Amount | Divinylbenzene Amount |
| --- | --- | --- |
| Estragole | 32.6 g; 0.22 mole | 33 g |
| Estragole | 32.6 g; 0.22 mole | 98 g |
| Allyl cyclohexyl propionate | 43.12 g; 0.22 mole | 12 g |
| Allyl cyclohexyl propionate | 43.12 g; 0.22 mole | 33 g |
| Allyl cyclohexyl propionate | 43.12 g; 0.22 mole | 97 g |
| Ocimene | 29.92 g; 0.22 mole | 12 g |
| Ocimene | 29.92 g; 0.22 mole | 33 g |
| Ocimene | 29.92 g; 0.22 mole | 97 g |
| Divinylsulfide | 18.96 g; 0.22 mole | 12-97 g |
| Vinyl methylketone | 15.42 g; 0.22 mole | 12-97 g |
| 4-methyl-5-vinyl thiazole | 27.5 g; 0.22 mole | 12-97 g |
| 2-methyl-5-vinyl pyrazine | 26.1 g; 0.22 mole | 12-97 g |
| Vinyl pyrazine | 23.32 g; 0.22 mole | 12-97 g |
| 1-penten-3-ol | 18.92 g; 0.22 mole | 12-97 g |
| 1-octen-3-ol | 28.16 g; 0.22 mole | 12-97 g |
| carvone | 33.00 g; 0.22 mole | 12-97 g |
| limonene | 29.92 g; 0.22 mole | 12-97 g |
| diallyl-disulfide | 32.18 g; 0.22 mole | 12-97 g |
| allylsulfide | 25.13 g; 0.22 mole | 12-97 g |
| allyl alpha ionone | 51.12 g; 0.22 mole | 12-97 g |

The monomers identified above to be polymerized with divinylbenzene can also be combined with styrene to yield the desired beads. In addition, divinylbenzene can be replaced with allylacrylate as the crosslinker or with other suitable divinyl compounds.

Microbeads produced from the polymers described above are made from food-grade monomers that can polymerize with divinylbenzene. The residual food-grade monomer in the microbeads can contribute flavor to the gum. Accordingly, to achieve a proper blend of food-grade monomer with the flavoring of the gum to achieve good taste, certain combinations of food-grade monomer and gum flavorings are preferred, as indicated in Table IV below.

TABLE IV

| Gum Flavoring | Monomer(s) |
| --- | --- |
| Mint | Estragole, ocimene, vinyl-methyl ketone, 1-octen-3-ol, 1-penten-3-ol, carvone, limonene, allyl alpha ionone |
| Onion | Divinylsulfide, diallyldisulfide, allylsulfide |
| Citrus | Ocimene, carvone, limonene |
| Peanut | 4-methyl-5-vinylthiazole, 2-methyl-5-vinylpyrazine, vinylpyrazine |
| Meat | 4-methyl-5-vinylthiazole, 2-methyl-5-vinylpyrazine, vinylpyrazine, diallyldisulfide, allylsulfide |
| Fruit | Eugenol, allylcyclohexyl propionate, limonene |
| Cinnamon | Estragole, eugenol, limonene |

EXAMPLE IV

Peppermint Non-Tack Gum With Coated Microbeads

The procedure of Example I is repeated, except that the microbeads of part A are coated with a gelatin coat as follows. A mixture (by weight) of 10% of the microbeads, 30% 300 Bloom gelatin, and 60% water is prepared where the water is heated to 63° C. prior to the addition of the gelatin and microbeads. The mixture is then cooled so that it gels, and the gel is ground to produce coated microbeads. The coated microbeads are then formulated into a gum as described in Example I, part C.

While several embodiments of the invention have been described, other embodiments will be apparent to those of ordinary skill in the art. Such embodiments are to be included within the scope of the present invention unless the following claims expressly state otherwise.

What is claimed is:

1. A chewing gum having dispersed therein water-insoluble porous polymeric beads having microporous passages impregnated with a plasticizing agent.

2. The chewing gum of claim 1 wherein said chewing gum includes a water-soluble bulk portion and a water-insoluble chewable gum base portion.

3. The chewing gum of claim 2 wherein said water-soluble bulk portion includes a sweetener.

4. The chewing gum of claim 3 wherein said water-soluble portion further includes a flavoring agent.

5. The chewing gum of claim 1 wherein said porous polymeric beads are coated with one or more of zein, modified and unmodified cellulosics, carbohydrates, water-insoluble polymers, silica, gum arabic, fats, food-grade shellac, wax, fatty acids, or mixtures thereof.

6. The chewing gum of claim 1 wherein said polymeric beads comprise a copolymer of monomer pairs selected from the group consisting of styrene and divinylbenzene, limonene and divinylbenzene, carvone and divinylbenzene, eugenol and divinylbenzene, and ocimene and divinylbenzene.

7. The chewing gum of claim 1 wherein said plasticizing agent is liquid at chewing temperature.

8. A method of producing a chewing gum with a controlled release plasticizer for extended softness of the gum during the chew, comprising:
   providing a chewing gum base; and
   dispersing within said base a plurality of water-insoluble porous polymeric beads having microporous passages impregnated with plasticizer.

9. The method of claim 8 wherein said porous polymeric beads are first coated with one or more of zein, modified and unmodified cellulosics, carbohydrates, water-insoluble polymers, silica, gum arabic, fats, food-grade shellac, wax, fatty acids, or mixtures thereof.

10. The method of claim 8 wherein said polymeric beads comprise a copolymer of monomer pairs selected from the group consisting of styrene and divinylbenzene, limonene and divinylbenzene, carvone and divinylbenzene, eugenol and divinylbenzene, and ocimene and dinvinylbenzene.

* * * * *